United States Patent
Frenzel (10) Patent No.: US 9,001,904 B2
(45) Date of Patent: Apr. 7, 2015

(54) MULTI-CARRIER CLOCK TRANSPORT AND SYNCHRONIZATION

(75) Inventor: Rudi Frenzel, Munich (DE)

(73) Assignee: Lantiq Deutschland GmbH, Neubiberg (DE)

( * ) Notice: Subject to any disclaimer, the term of this patent is extended or adjusted under 35 U.S.C. 154(b) by 824 days.

(21) Appl. No.: 12/759,797

(22) Filed: Apr. 14, 2010

(65) Prior Publication Data

US 2011/0216816 A1    Sep. 8, 2011

Related U.S. Application Data

(60) Provisional application No. 61/310,186, filed on Mar. 3, 2010.

(30) Foreign Application Priority Data

Mar. 17, 2010   (EP) .................................. 10002804

(51) Int. Cl.
*H04L 27/28* (2006.01)
*H04B 1/38* (2006.01)
*H04L 27/00* (2006.01)

(52) U.S. Cl.
CPC . *H04B 1/38* (2013.01); *H04L 27/00* (2013.01)

(58) Field of Classification Search
USPC .......................................................... 375/260
See application file for complete search history.

(56) References Cited

U.S. PATENT DOCUMENTS

| | | | |
|---|---|---|---|
| 6,697,013 B2 * | 2/2004 | McFarland et al. ........... 342/159 |
| 7,433,398 B2 * | 10/2008 | Luo et al. ...................... 375/232 |
| 7,920,881 B2 * | 4/2011 | Fullam .......................... 455/502 |
| 2003/0021237 A1 * | 1/2003 | Min et al. ...................... 370/252 |
| 2005/0213676 A1 * | 9/2005 | Stopler ......................... 375/260 |
| 2005/0232308 A1 * | 10/2005 | Redfern ........................ 370/503 |
| 2006/0098725 A1 * | 5/2006 | Rhee et al. .................... 375/222 |
| 2007/0025383 A1 * | 2/2007 | Katar et al. ................... 370/442 |
| 2007/0053340 A1 * | 3/2007 | Guilford ....................... 370/350 |
| 2008/0071516 A1 * | 3/2008 | Cioffi et al. ..................... 703/21 |
| 2008/0165838 A1 * | 7/2008 | Vanderhaegen et al. ...... 375/224 |
| 2008/0239982 A1 * | 10/2008 | Vanderhaegen et al. ...... 370/252 |
| 2008/0279322 A1 * | 11/2008 | Franovici et al. ............. 375/371 |
| 2008/0287153 A1 * | 11/2008 | Fullam .......................... 455/502 |
| 2009/0154487 A1 * | 6/2009 | Ryan et al. .................... 370/445 |
| 2009/0170430 A1 * | 7/2009 | Rangan et al. ................. 455/39 |
| 2009/0207865 A1 * | 8/2009 | Yonge et al. .................. 370/503 |
| 2010/0070817 A1 * | 3/2010 | Heise ............................ 714/749 |
| 2010/0100574 A1 * | 4/2010 | Masuda ........................ 707/827 |
| 2010/0111099 A1 * | 5/2010 | Yonge et al. .................. 370/458 |
| 2010/0184395 A1 * | 7/2010 | Bagge et al. ............... 455/161.1 |
| 2010/0290507 A1 * | 11/2010 | Tzannes ........................ 375/219 |
| 2011/0075685 A1 * | 3/2011 | Xu et al. ....................... 370/503 |
| 2011/0274149 A1 * | 11/2011 | Xu et al. ....................... 375/222 |
| 2012/0027414 A1 * | 2/2012 | Wei ............................... 398/100 |

* cited by examiner

*Primary Examiner* — Santiago Garcia (57) ABSTRACT

At least one implementation generates at least one time-domain sample in a multicarrier apparatus, and links a first timestamp to the at least one time-domain sample. The at least one time-domain sample may be associated with a Discrete Multi-Tone (DMT) symbol and transmitted to a receiving multicarrier apparatus. The receiving multicarrier apparatus may generate a second timestamp upon receiving the at least one time-domain sample.

13 Claims, 6 Drawing Sheets

MULTI-CARRIER CLOCK TRANSPORT AND SYNCHRONIZATION

REFERENCE TO RELATED APPLICATIONS

This Application claims priority benefit of U.S. Provisional Application 61/310,186, which was filed on Mar. 3, 2010. The entire contents of the Provisional Application are incorporated herein by reference.

BACKGROUND

Stringent requirements are often placed on the time synchronism of nodes employed in distributed communication or communication network systems. In general, a time synchronization protocol is required to achieve time synchronization between at least two nodes distributed in a packet-switched network. In at least one implementation, one node for providing a reference clock for time synchronization is set as a master node. A node to be time-synchronized with the master node is set as a slave node, and then the master and the slave nodes exchange messages including time information to achieve time synchronization between the master and the slave nodes.

Two known time synchronization protocols or techniques include: Network Time Protocol (NTP) and Precision Time Protocol (PTP). NTP may be the most widely used protocol for time synchronization over Local Area Networks (LANs) and Wide Area Networks (WANs). NTP is relatively inexpensive to implement, requiring little in the way of hardware. It can usually maintain time synchronization within 10 milliseconds over the public Internet and can attain accuracies of 200 seconds or better in LANs under ideal conditions. However, the current version of NTP does not meet the higher precision requirements required by many latency critical applications.

IEEE 1588 Standard (Precision Clock Synchronization Protocol for Networked Measurement and Control Systems), also known as Precision Time Protocol (PTP), has received considerable attention since its introduction. PTP forms the basis for defining Ethernet links that can transport synchronization signals with small and well-defined delays (with accuracy on the order of sub-milliseconds), synchronizing Ethernet tasks over large physical distances.

PTP clocks are organized in a master-slave hierarchy, where each slave synchronizes to its master based on timing messages exchanged between the master and slave. The master sends to the slave synchronization messages that include the sending time and measures the time difference between the master and slave clocks using the response messages received from the slave. Similarly, the slave sends to the master delay request messages that contain the estimate of the sending time and measures the time difference between the slave and master clocks. The one-way delay between the clocks and the offset of the slave clock can then be determined based on two measurements, enabling the slave to correct its clock based on the offset.

PTP timing messages are generally issued by PTP application code in one clock and received and processed by the PTP application code in another clock. These messages typically have a preamble specified by the physical layer of the communication protocol in use on the network. The preamble is followed by one or more protocol specific headers and then user data such as the PTP payload. As a PTP message traverses the protocol stack in a node, timestamps are generated when the message timestamp point passes a defined point in the stack. This defined point may be in the application layer, in the kernel or interrupt service routines, or in the physical layer of the protocol stack. In general, the closer this point is to the actual network connection, the smaller the timing errors introduced by fluctuations in the time taken to traverse the lower layers. In cases where timestamps are generated in the physical layer, hardware assist circuitry is often employed. In this case, the timestamp is conveyed to the PTP code via a path outside of the normal path followed by the PTP timing message itself. To ensure that the timestamps are associated with the correct message, the hardware assist often captures additional information from the PTP timing message that is passed with the timestamp to the PTP code.

PTP relies on the ability to associate a timestamp to an actual point in time when message information is sent out. However, in digital communication systems that use multi-carrier modulation, such as in xDSL technologies that may include Asymmetric Digital Subscriber Line (ADSL), ADSL2, ADSL2+, Very high speed DSL (VDSL), VDSL2, G.Lite, and High bit rate Digital Subscriber Line (HDSL) and the like, it is not possible to apply a timestamp precisely to a particular part of a message at substantially the point in time that the message is transmitted to a receiving device. In particular, multi-carrier modulation schemes, such as Orthogonal Frequency Division Multiplexing (OFDM) and Discrete Multi-Tone (DMT), process data and associated timestamp information in the frequency domain and convert the data and associated timestamp information into time-domain output samples that are known as multicarrier symbols or DMT symbols. Associating the timestamp information to data in the frequency domain means that it is not possible to determine the time instant that the timestamp information is transmitted. Moreover, additional timing uncertainty is created at the receiving device. In particular, it is difficult for the receiving device to ascertain the location of timing information associated with the received multicarrier symbols until after frequency domain processing is complete.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different instances in the description and the figures may indicate similar or identical items.

DETAILED DESCRIPTION

Overview

At least one implementation herein generates at least one time-domain sample in a transmitting multicarrier apparatus, and links a first timestamp to the at least one time-domain sample. The at least one time-domain sample may be associated with a Discrete Multi-Tone (DMT) symbol and transmitted to a receiving multicarrier apparatus. The first timestamp and an identifier that indicates the linked time-domain sample may be sent to the receiving multicarrier apparatus in one or more xDSL messages. The receiving multicarrier apparatus may generate a second timestamp upon receiving the at least one time-domain sample, which was identified in the one or more xDSL messages. The receiving multicarrier apparatus may use information assimilated from at least the first and second timestamps ensure its clock is properly synchronized, coordinate events associated with the multicarrier apparatuses, and so on.

The independent claims define embodiments of the invention in various aspects. The dependent claims define further embodiments according to the invention.

An embodiment of the method according to the invention in the first aspect comprises generating, in a multicarrier apparatus, at least one time-domain symbol including a plurality of time-domain samples; generating a timestamp, and linking the generated timestamp to at least one time-domain sample of the plurality of time-domain samples. In an embodiment of the method according to the invention in the first aspect, the aforementioned time-domain symbol is a Discrete Multi-Tone (DMT) symbol. In an embodiment of the method according to the invention in the first aspect, the aforementioned at least one time-domain sample is a first time-domain sample of the DMT symbol. In an embodiment of the method according to the invention in the first aspect, the aforementioned act of generating the timestamp occurs approximately at a time the at least one time-domain sample undergoes conversion in preparation for transmission to a receiving multicarrier apparatus. In an embodiment of the method according to the invention in the first aspect, the aforementioned conversion is digital to analog conversion (DAC) of the time-domain sample. In an embodiment of the method according to the invention in the first aspect, the aforementioned act of linking links the generated timestamp to the at least one time-domain sample of a single Discrete Multi-Tone (DMT) symbol associated with a superframe. In an embodiment of the method according to the invention in the first aspect, the aforementioned superframe is an Asymmetric Digital Subscriber Line (ADSL) superframe or Very high speed DSL (VDSL) superframe. In an embodiment of the method according to the invention in the first aspect, an additional act includes generating one or more messages that includes at least the generated timestamp and an identifier that indicates the linked at least one time-domain sample.

An embodiment of the method according to the invention in the second aspect comprises receiving, at a multicarrier apparatus, a first timestamp linked to a time-domain sample of a Discrete Multi-Tone (DMT) symbol, and generating a second timestamp upon receiving the DMT symbol or a subsequent DMT symbol. In an embodiment of the method according to the invention in the second aspect, the method further comprises receiving a message that identifies the time-domain sample that is linked to the first timestamp. In an embodiment of the method according to the invention in the second aspect, the method further comprises generating a third timestamp linked to another time-domain sample of a DMT symbol and transmitting another message that identifies the another time-domain sample of the DMT symbol that is linked to the third timestamp. In an embodiment of the method according to the invention in the second aspect, method further comprises receiving a fourth timestamp; and calculating clock synchronization information using the first, second, third and fourth timestamps. In an embodiment of the method according to the invention in the second aspect, the method further comprises determining DMT symbol correction information based on at least one or more of the first, second, third and fourth timestamps. In an embodiment of the method according to the invention in the second aspect, the aforementioned act of generating the second timestamp generates the second timestamp upon receiving a predetermined time-domain sample of the DMT symbol or the subsequent DMT symbol. In an embodiment of the method according to the invention in the second aspect, the aforementioned predetermined time-domain sample of the subsequent DMT symbol is an initial time-domain sample of the DMT symbol or the subsequent DMT symbol.

An embodiment of an apparatus according to the invention in the third aspect comprises a controller; and a storage coupled to the controller and including executable instructions to generate: at least one Discrete Multi-Tone (DMT) symbol for communication on a communication medium, and at least one timestamp to be linked to the at least one DMT symbol, the timestamp linked to the at least one DMT symbol prior to communication thereof on the communication medium. In an embodiment of the apparatus according to the invention in the third aspect, the aforementioned instructions further include instructions to assign the least one DMT symbol to a superframe including a plurality of DMT symbols. In an embodiment of the apparatus according to the invention in the third aspect, the aforementioned instructions further include instructions to assign the at least one DMT symbol assign the least one DMT symbol to an initial data frame position of the superframe. In an embodiment of the apparatus according to the invention in the third aspect, the aforementioned instructions include instructions to generate the timestamp generate a timestamp to be linked to a DMT symbol every N generated DMT symbols, where N is an integer value. In an embodiment of the apparatus according to the invention in the third aspect, the aforementioned instructions include instructions to generate the at least one timestamp generate the at least one timestamp to be linked to a time-domain sample of the at least one DMT symbol.

An embodiment of an apparatus according to the invention in the fourth aspect comprises a controller; and a storage coupled to the controller and including executable instructions that enable the multicarrier apparatus to: receive a first timestamp linked to a time-domain sample of a Discrete Multi-Tone (DMT) symbol, and generate a second timestamp upon receiving the DMT symbol or a subsequent DMT symbol. In an embodiment of the apparatus according to the invention in the third aspect, the aforementioned instructions include instructions further enable to the multicarrier apparatus receive a message that identifies the time-domain sample that is linked to the first timestamp. In an embodiment of the apparatus according to the invention in the third aspect, the aforementioned instructions enable the multicarrier apparatus to generate the second timestamp upon receiving a predetermined time-domain sample of the DMT symbol or the subsequent DMT symbol. In an embodiment of the apparatus according to the invention in the third aspect, the aforementioned predetermined time-domain sample of the subsequent DMT symbol is an initial time-domain sample of the DMT symbol or the subsequent DMT symbol.

Exemplary Communication Arrangement

Figure 1:
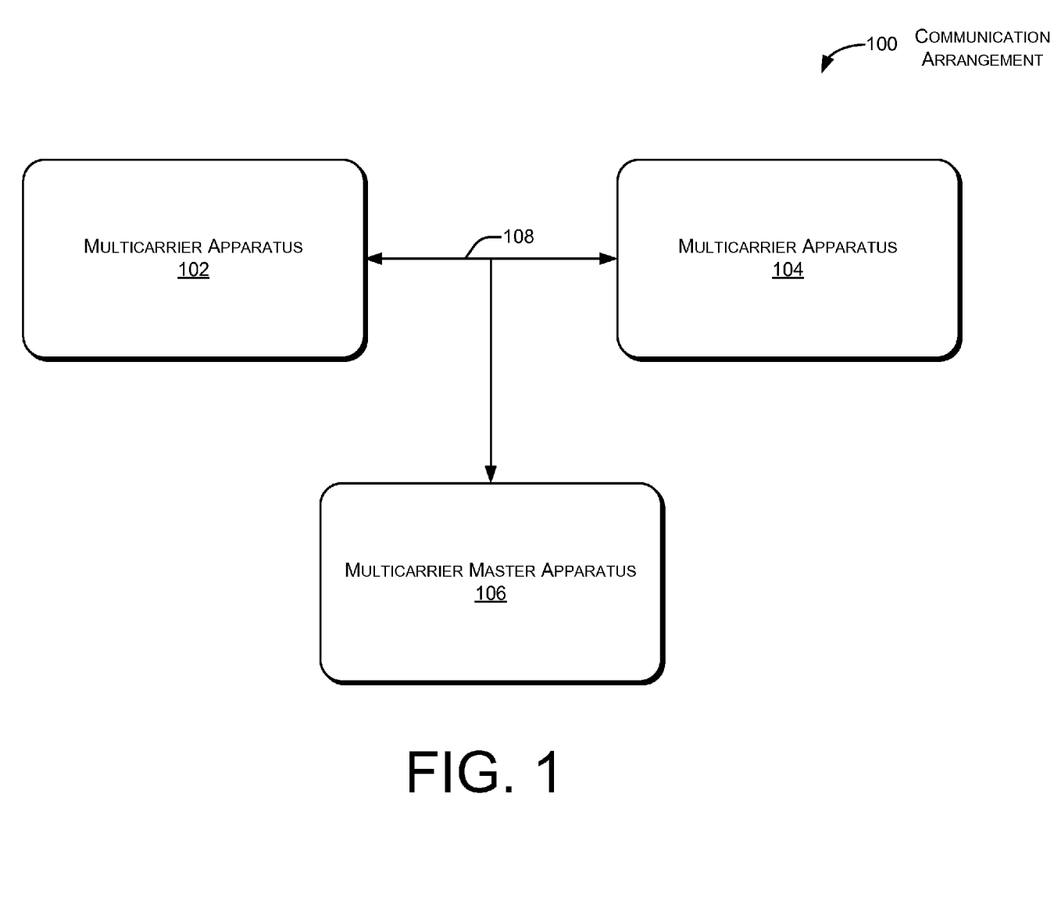
FIG. 1 illustrates an exemplary communication arrangement that employs a plurality of multicarrier apparatuses. In one implementation, the multicarrier apparatuses are Orthogonal Frequency Division Multiplexing (OFDM) apparatuses.

FIG. 1 illustrates an exemplary communication arrangement 100 that employs at least two multicarrier apparatuses or nodes 102 and 104. The exemplary communication arrangement 100 may also employ a multicarrier master apparatus or master node 106. The master node 106 may be receive a master clock signal from a network source, or contain a clock source that is being used as the master clock. Slave nodes, such as nodes 102 and 104, correct their internal clocks using the time of the master clock. In one implementation, the multicarrier apparatuses 102, 104 and 106 are Orthogonal Frequency Division Multiplexing (OFDM) apparatuses capable of implementing the herein described clock transport and synchronization procedures.

The multicarrier apparatuses 102, 104 and 106 may communicate through a communication channel 108. The communication channel 108 may be realized as a wireless communication medium, a wireline communication medium (e.g., coaxial cable, twisted pair of copper wires, power line wiring, optical fiber, etc.), or combinations thereof. The communication channel 108 may be a shared medium like a bus structure or a private medium between each pair of multicarrier apparatuses (e.g., multicarrier apparatuses 102 and 104). Accordingly, the multicarrier apparatuses 102, 104 and 106 may include structure and functionality that enable signal communication over such medium. Such structure and functionality may include one or more antennas, integrated wireline interfaces, and the like. Depending on the implementation, the multicarrier apparatuses 102, 104 and 106 may communicate with one another directly (peer-to-peer mode) or the multicarrier apparatuses 102 and 104 may communicate via the master apparatus 106.

In one implementation, the exemplary communication arrangement 100 may be a home network and the multicarrier master apparatus 106 may be an access point of the home network. For example, in the implementation the master apparatus 106 may be a residential gateway that distributes broadband services to the multicarrier apparatuses 102 and 104. The multicarrier apparatuses 102 and 104 may be associated with digital content destinations in the home, but may also be associated with digital content sources, such as digital video recorders (DVR), computers providing streaming video, televisions, entertainment centers, and the like. In another implementation, the exemplary communication arrangement 100 may be xDSL arrangement, where the multicarrier master apparatus 106 is associated with a Central Office (CO) and the multicarrier apparatuses 102 and 104 may be Customer Premises Equipment (CPE) associated with one or more customer sites. In another implementation, the exemplary communication arrangement 100 may be xDSL arrangement, where the multicarrier master apparatus 106 is associated with a gateway of a mobile backhaul network and the multicarrier apparatuses 102 and 104 may be associated with one or more wireless base stations.

The multicarrier apparatuses 102, 104 and 106 may be enabled to communicate using packet-based technology (e.g., ITU G.hn, HomePNA, HomePlug® AV and Multimedia over Coax Alliance (MoCA)) and xDSL technology. Such xDSL technology may include Asymmetric Digital Subscriber Line (ADSL), ADSL2, ADSL2+, Very high speed DSL (VDSL), VDSL2, G.Lite, and High bit rate Digital Subscriber Line (HDSL). In addition, the multicarrier apparatuses 102, 104 and 106 may be enabled to communicate using IEEE 802.11 and IEEE 802.16 (WiMAX) wireless technologies. Therefore, in general, the multicarrier apparatuses 102, 104 and 106 may establish a communication link that enables exchange of packets between the apparatuses 102, 104 and 106.

Signals exchanged between the multicarrier apparatuses 102, 104 and 106 may include multicarrier symbols that each include a plurality of tones or sub-channels. Each of the tones within a multicarrier symbol may have data bits modulated thereon that are intended for delivery from one of the multicarrier apparatuses 102, 104 and 106 to another.

Figure 2:
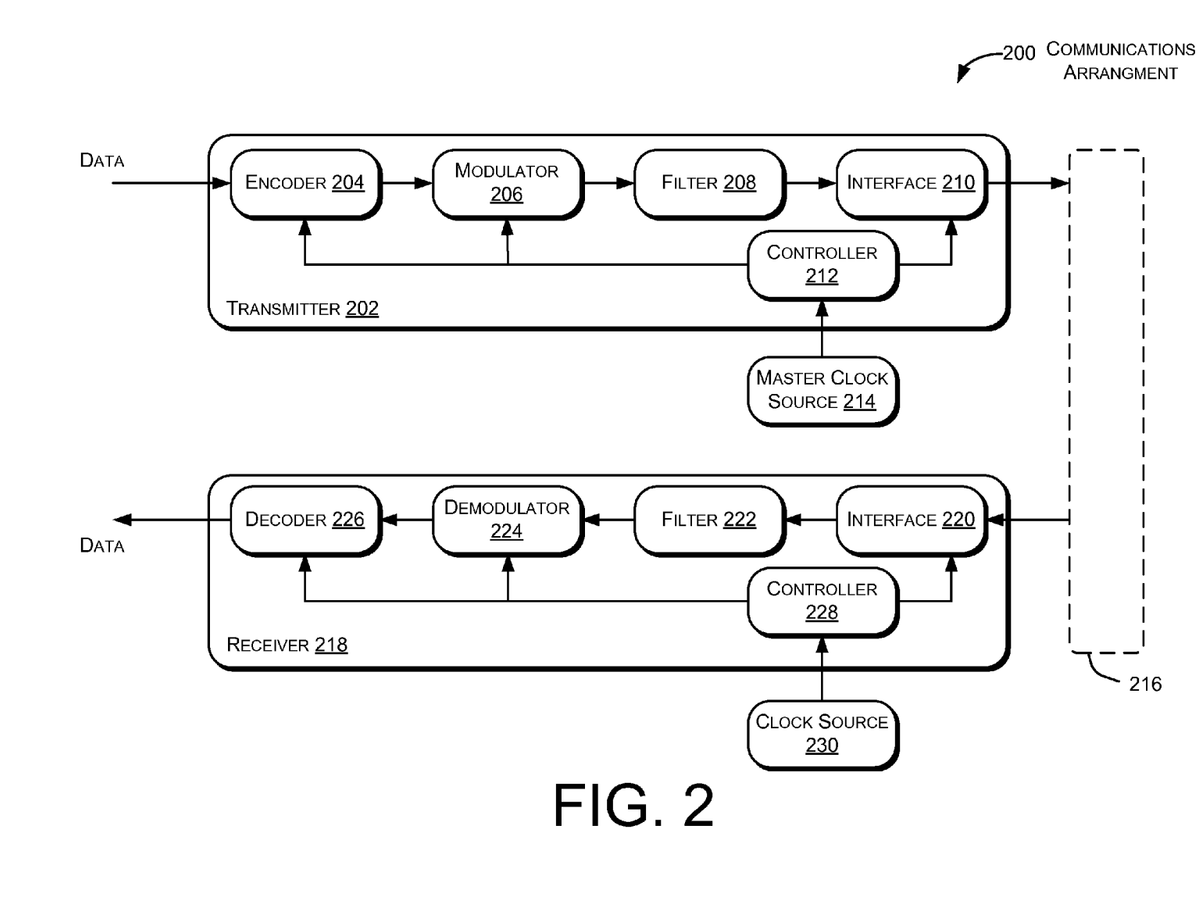
FIG. 2 illustrates an exemplary transceiver apparatus that may be used as a transmitting and receiving apparatus in a multicarrier arrangement or system. The multicarrier apparatuses and multicarrier controller apparatus illustrated in FIG. 1 may be implemented in the same or similar manner as the exemplary transceiver apparatus.

FIG. 2 illustrates a communication arrangement 200 that may include at least one master node having an associated transmitter 202 and at least one slave node having an associated receiver 218. The master node may also have a receiver (not illustrated) and the slave node may also have a transmitter (not illustrated). The multicarrier apparatuses 102, 104 and 106 illustrated in FIG. 1 may be implemented to include both the transmitter 202 and receiver 218 illustrated in FIG. 1. In one implementation, the receiver 218 has an associated clock source 230 that is to be synchronized to a master clock source 214. The master clock source 214 and the clock source 230 may be external network clock sources. In another implementation, the master clock source 214 is to be synchronized to the clock source 230 associated with the receiver 218. This description describes processes associated with synchronizing the clock source 230 to the master clock source 214.

The multicarrier apparatuses 102, 104 and 106 may utilize own clock sources (not illustrated in FIG. 2 and FIG. 3) for the purposes of clocking and scheduling the transmitter and receiver functions of the communication link. In ADSL and VDSL communication based networks the central side transceiver maintains an ADSL or VDSL master clock source which is in general independent from network node clock like the master clock source 214 in FIG. 2. The remote side ADSL or VDSL transceiver maintains an own local clock which will be adjusted and finally locked to the central side clock during the link up procedure of the ADSL or VDSL communication link. The local clock of the remote side communication transceiver is in general independent of the network node clock source 230 of FIG. 2. It should be understood that the implicit assumption that the ADSL or VDSL central side transceiver resides on the same network node which accommodates the Master Clock Source 214 is not a mandatory requirement. In fact, the network node with the Master Clock Source 214 may also host the remote side ADSL or VDSL transceiver. The ADSL or VDSL communication clock frequency defines the frequency separation of the subcarriers and the sample rate of the multicarrier modulation scheme.

The transmitter 202 may include an encoder 204, a modulator 206, a filter 208, an interface 210 and a controller 212. As used herein, the term "controller" is meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. The clock source 214 generates a clock signal having a predetermined frequency.

The encoder 204 may be capable of receiving data that is for communication to a receiving device, such as a device including the receiver 218, coupled to the transmitter 202 via a wireless or wireline medium 216. More specifically, the encoder 204 may be capable of translating incoming data bit streams into in-phase and quadrature components for each of the plurality of tones. The encoder 204 may be arranged to output a number of symbol sequences that are equal to the number of tones available to the system. The modulator 206 may be capable of receiving symbol sequences to produce modulated signals in the form of discrete multi-tone (DMT) signals. The modulator 206 may pass the modulated signals to the filter 208 to undergo various filtering and then the filtered signals may be passed to the interface 210 for communication over the medium 216 to a receiving device. The interface 210 may include the necessary functionality that performs digital to analog conversion (DAC) of the filtered signals before the signals are communicated over the medium 216.

The receiver 218 may include an interface 220, a filter 222, a demodulator 224, a decoder 226 and a controller 228. Signals received by the receiver 218 may be passed to the filter 222 via the interface 220. The interface 220 may include the necessary functionality that performs analog to digital conversion (ADC) of the received signals before being passed to the filter 222. After received signals undergo filtering by way of the filter 222, the filtered signals may be demodulated by the demodulator 224. The demodulated signals may be passed to and processed by the decoder 226. The decoder 226 produces data bit streams for consumption by a computing device, or the like. Effectively, the demodulator 224 and the decoder 226 perform the opposite functions of the modulator 206 and the encoder 204, respectively.

The receiver 218 may also include a clock source 230 that is coupled to the controller 228. The clock source 230 generates a clock signal having a predetermined frequency. The clock source 230 may be synchronized with the master clock source 214.

Figure 3:
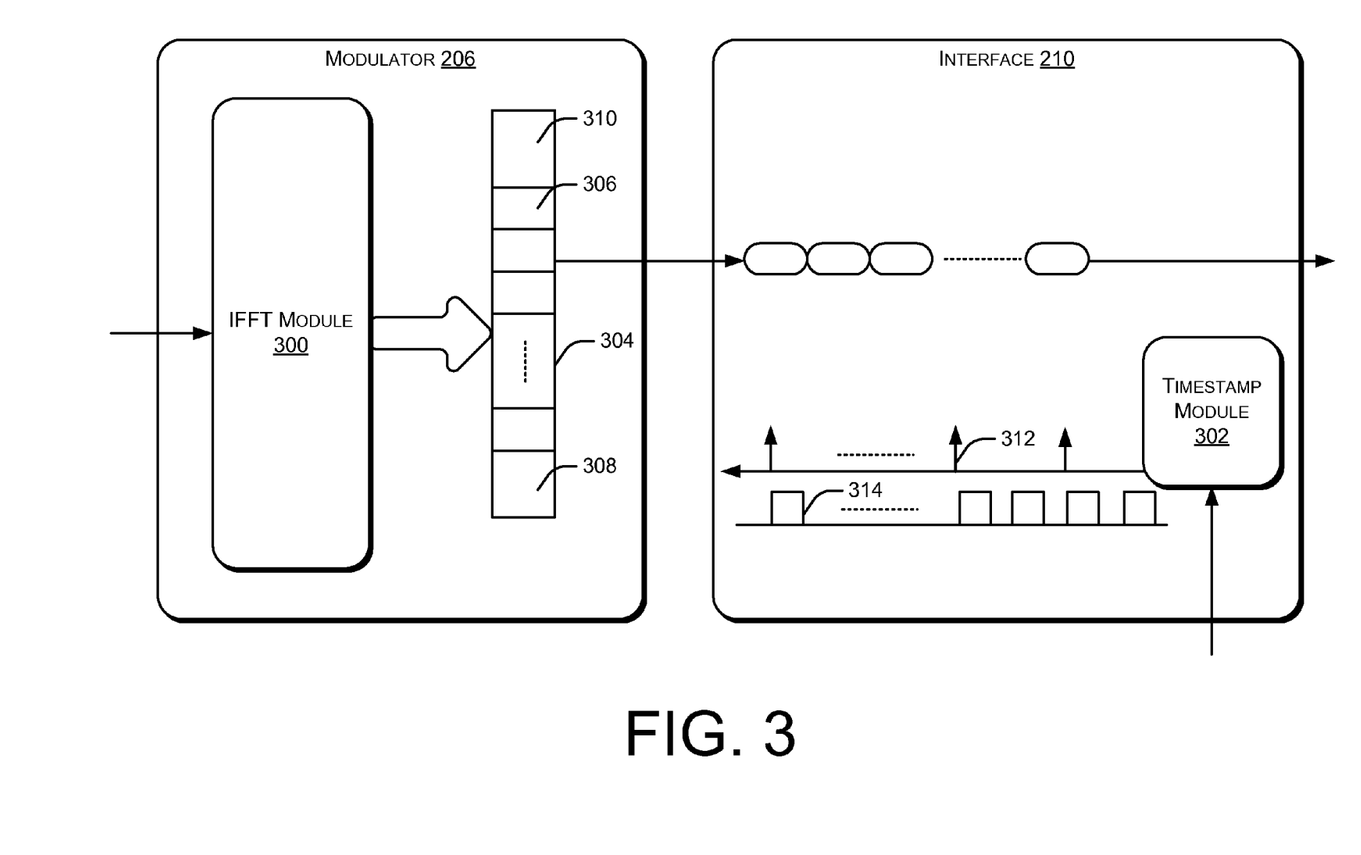
FIG. 3 illustrates a detailed representation of the modulator and interface introduced in FIG. 2.

FIG. 3 illustrates a detailed representation of the modulator 206 and interface 210 introduced in FIG. 2. The modulator 206 may receive an appropriate number of bits from the serial data stream that was received by encoder 204. In particular, the encoder 204 provides symbol sequences that are equal to the number of tones available to the system. Quadrature Phase-Shift Keying type modulation (QPSK), Quadrature Amplitude Modulation (QAM) or another modulation techniques may be used to generate the symbol sequences. More generally, the modulator 206 receives a parallel array of complex numbers representing phase and amplitude information for each tone available to the system, i.e. expressed in frequency domain values.

The modulator 206 may include an Inverse Fast Fourier Transform (IFFT) module 300. The IFFT module 300 may receive the symbol sequences in a parallel manner. The IFFT module 300 may convert each of the symbol sequences from the frequency domain to the time-domain. Each of the converted symbols may be a DMT symbol. For clarity, one DMT symbol 304 is illustrated in FIG. 3. However, as those skilled in the art appreciate, the IFFT module 300 may create N DMT symbols, as dictated by system requirements and the modulation technique implemented by the encoder 204.

Each DMT symbol 304 may be comprised of a plurality of time-domain samples 306. In addition, each DMT symbol 304 may include a cyclic extension, such as a cyclic prefix 308 and/or a cyclic suffix 310. The cyclic prefix 308 and the cyclic suffix 310 may simply repeat a set of the last and first samples, respectively, for a given DMT symbol. The cyclic extension may be used to reduce the out-of-band interference caused by the transmitter 202.

Each DMT symbol 304 and its associated time-domain samples 306 may be fed sequentially to the filter 208 and subsequently the interface 210 before being communicated to a receiver via the medium 216. In one implementation, the DMT symbols 304 are each separated by a frequency of 4.3125 kHz and span a frequency bandwidth from 0 kHz to 1104 kHz. Accordingly, the DMT symbols 304, in such an implementation, are numbered from 0 to 255. Other implementations may use more or less DMT symbols 304. Moreover, in the exemplary implementation, each DMT symbol 304 includes 544 time-domain samples 306. Therefore, the sampling rate, which is the rate in which the time-domain samples 306 are fed from the modulator 206, is 2.208 MHz. Other implementations may use a different sampling rate.

A timestamp module 302 may be interfaced with the controller 212. In FIG. 2, the timestamp module 302 is shown as being integrated with the interface 210. However, the timestamp module 302 may also be integrated with another element, or implemented as a standalone module. The timestamp module 302 may receive clock information from the master clock source 214 by way of the controller 212. The timestamp logic 302 may be configured to generate a timestamp 312 that may be transmitted as part of a data message. In one implementation, the timestamp module 302 is configured, via the master clock source 214 and the controller 212, to generate the timestamp 312 at the rising or falling edge of a predetermined sampling rate clock signal 314. The controller 212 may direct the timestamp module 302 to generate a timestamp 312 at substantially the same time a predetermined time domain sample 306 is ready for transmission over the medium 216. This predetermined time-domain sample 306 may be the first time-domain sample 306 of a particular DMT symbol 304. In one implementation, the timestamp 312 is generated as the predetermined time-domain sample 306 is processed or input into the DAC associated with the interface 210.

In one implementation, the controller 212 may direct the timestamp module 302 to generate a timestamp at a predetermined time-domain sample 306 every N DMT symbol 304. For example, the timestamp module 302 may be directed to generate a timestamp at a particular time-domain sample 306 of one DMT symbol 304 that is part of a DMT superframe. As those of skill in the art appreciate, a DMT superframe may be comprised of a plurality of data frames, where each data frame includes one DMT symbol. For example, a VDSL2 superframe is comprised of 256 data frames, numbered 0 to 255. The 255$^{th}$ data frame is followed by a single sync frame. In ADSL, a superframe is comprised of 68 data frames, numbered 0 to 67. The 67$^{th}$ frame is followed by a single sync frame. Other xDSL technologies may implement superframes including N data frames, where N is an integer value.

Figure 4:
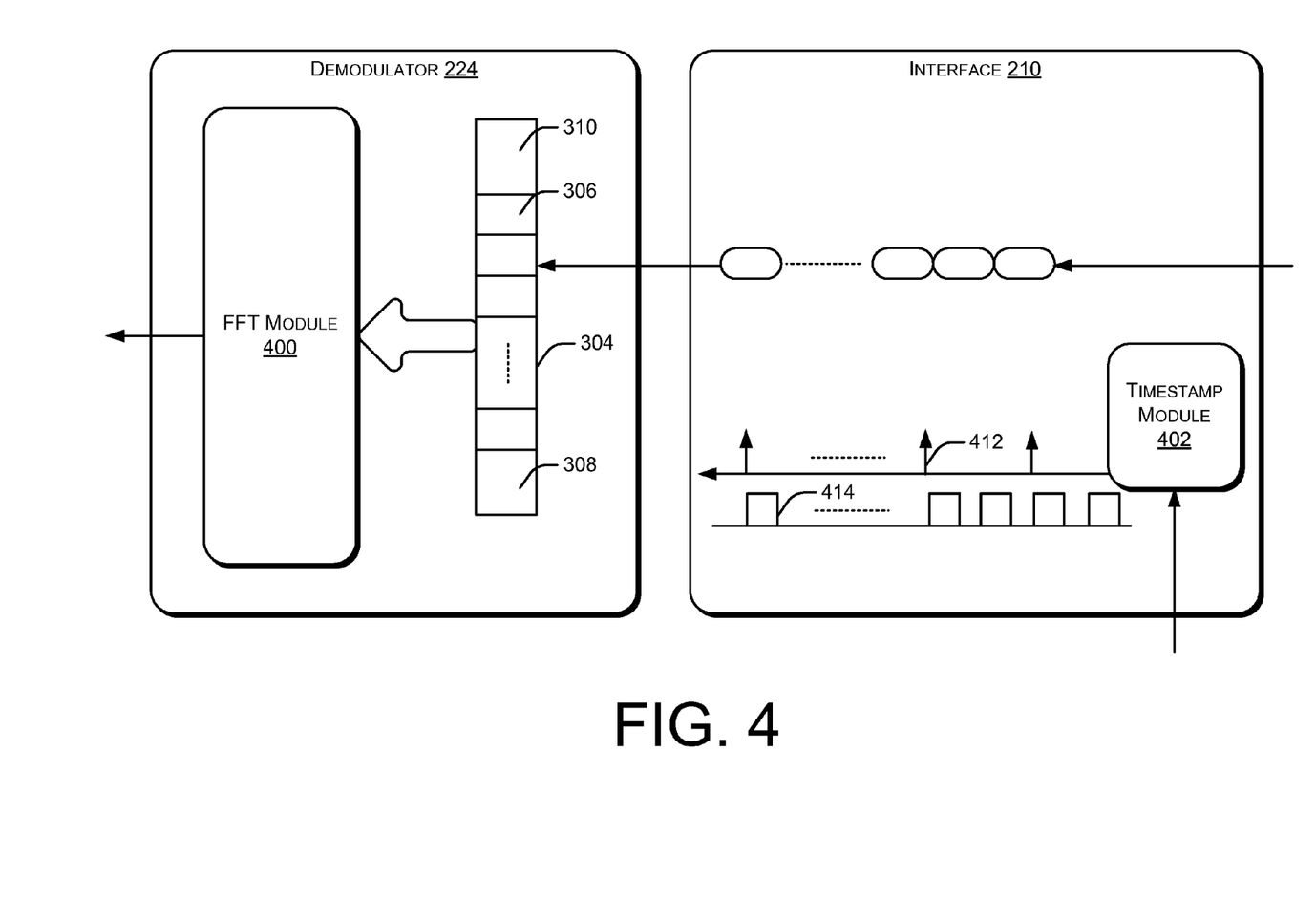
FIG. 4 illustrates a detailed representation of the demodulator and interface introduced in FIG. 2.

FIG. 4 illustrates a detailed representation of the demodulator 224 and interface 220 introduced in FIG. 2. The demodulator 224 may receive the time-domain samples 306 associated with the DMT symbols 304. The time-domain samples 306 are provided to the demodulator 224 after undergoing ADC conversion by the interface 220 and filtering by the filter 222. The time-domain samples 306 may have been transmitted by the transmitter 202 over the medium 216.

The time-domain samples 306 may be fed into an FFT module 400 of the demodulator 224. The FFT module 400 may convert the time-domain samples 306 of the DMT symbols 304 to frequency domain information. The frequency domain information may be fed to the decoder 226, which maps the frequency domain information into corresponding bit sequences to recreate the original serial data stream.

A timestamp module 402 may be configured, via the controller 228, to generate a timestamp 412 at the rising or falling edge of a predetermined sampling rate clock signal 414. The controller 228 may direct the timestamp module 402 to generate a timestamp 412 at substantially the same time a predetermined time domain sample 306 is received from the medium 216. The predetermined sampling clock signal 414 may coincide with the inflow processing of the predetermined time-domain sample 306 as it is processed or output from the ADC associated with the interface 210.

In one implementation, the transmitter 202 may inform the receiver 218, by way of a xDSL message, that the timestamp 312 will be generated at the predetermined time-domain sample 306 of a forthcoming DMT symbol 304. In this manner, the transmitter 202 links the timestamp 312 to the predetermined time-domain sample 306 of the DMT symbol 304. The receiver 218 uses this information to generate the timestamp 412 as the predetermined time-domain sample 306 of the DMT symbol 304 is received by the receiver 218. In one implementation, the transmitter 202 may instruct the receiver to generate the timestamp 412 after N sampling rate clock signal cycles. Such N sampling rate clock signal cycles may correspond to the first time-domain sample in each DMT symbol received by the receiver 218. In another implementation, the N sampling rate clock signal cycles may correspond to a particular time-domain sample associated with one DMT symbol of an xDSL superframe. In yet another implementation, the N sampling rate clock signal cycles may correspond to a particular time-domain sample associated with one DMT symbol after a predetermined number of DMT symbols has been accounted for (e.g., by way of a counter). In one implementation, a counter is implemented by receiver 218, which counts each DMT symbol received and/or generated thereby.

The receiver 218, using the timestamp 312 from the transmitter 202 and its own timestamp 412, may synchronize the clock source 230 to the master clock source 214. Another message exchange may occur between the receiver 218 and the transmitter 202 to measure the delay between the two devices. To measure the delay between the receiver 218 and the transmitter 202, where the delay is assumed to be the same in both directions between the devices, the receiver 218 may generate a further timestamp at a predetermined time-domain sample of a DMT symbol transmitted thereby. The further timestamp may be carried in an xDSL data message, or the like. The transmitter 202 may generate another timestamp when the predetermined time-domain sample of the DMT symbol is processed (e.g., immediately after ADC). The another timestamp generated by the transmitter 202 may be sent to the receiver 218 in an xDSL data message.

In accordance with the foregoing, the receiver 218 may calculate offset and delay, which are used to synchronize the clock source 230 to the master clock source 214, in accordance with the following formulas:

Delay+Offset=timestamp 412 ($T_2$)−timestamp 312 ($T_1$)

Delay−Offset=another timestamp ($T_4$)−further timestamp ($T_3$)

Delay=(($T_2-T_1$)+($T_4-T_3$))/2

Offset=(($T_2-T_1$)−($T_4-T_3$))/2

Figure 5:
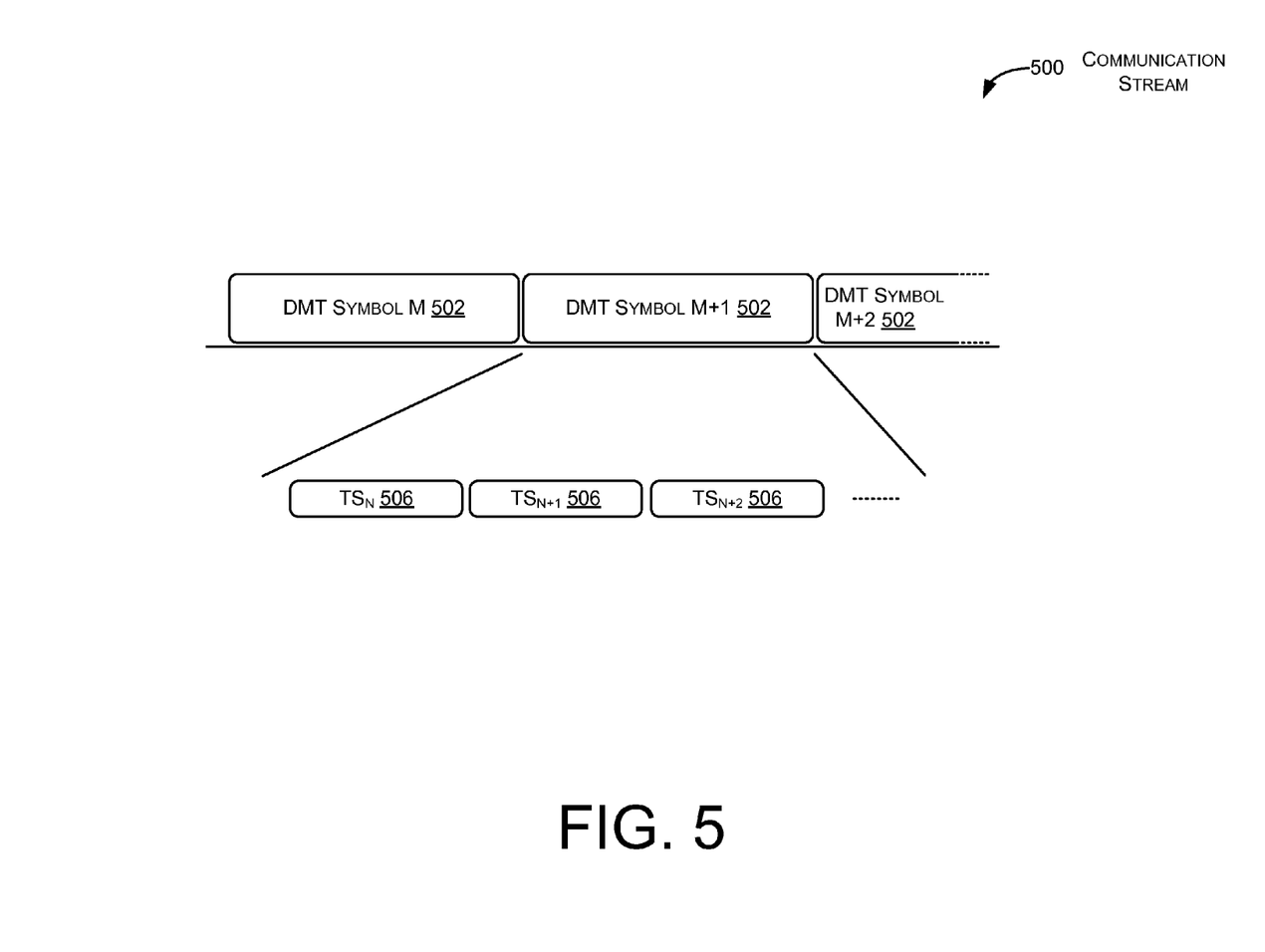
FIG. 5 illustrates a number of Discrete Multi-Tone (DMT) symbols that may comprise a communication stream.

FIG. 5 illustrates a number of DMT symbols that may comprise a communication stream 500, or a portion thereof, that may be transmitted by a multicarrier transceiver device (e.g., the transmitter 202 and/or receiver 218). The portion of the communication stream 500 may include three DMT symbols 502 (i.e., DMT symbol M, DMT symbol M+1, and DMT symbol M+2). As is illustrated in FIG. 5, each DMT symbol 502 may include a number of time-domain samples 506 (i.e., $TS_N$, $TS_{N+1}$, and $TS_{N+2}$). In one implementation, a timestamp is generated at one $TS_N$ 506 of a DMT symbol. In another implementation a timestamp is generated at a $TS_{N+K}$ of a DMT symbol after a predetermined number K of time-domain samples. In another implementation, a timestamp is at a predetermined number K of time-domain samples $TS_{N+K, M}$ 506 of a DMT symbol associated with an xDSL superframe, wherein M is an integer value up to a maximum frame number for the xDSL superframe.

As indicated in the foregoing, a VDSL2 superframe is comprised of 256 data frames, numbered 0 to 255. The 255$^{th}$ data frame is followed by a single sync frame. In ADSL, a superframe is comprised of 68 data frames, numbered 0 to 67. The 67$^{th}$ frame is followed by a single sync frame. The sync frame, used in both VDSL2 and ADSL, is used to establish superframe boundaries. Therefore, the superframe duration in VDSL2 is 64.25 ms and the superframe duration is ADSL is 17 ms.

In addition to the foregoing and to clarify further, in one implementation, the multicarrier apparatus 106 may generate a timestamp $T_1$ at the beginning of the first DMT symbol of the superframe N. The multicarrier apparatus 106 then indicates through a data message to a remote multicarrier apparatus (apparatus 102 and/or apparatus 104) that it should generate a timestamp $T_2$ upon reception of the first DMT symbol of a subsequent superframe N+1. As the subsequent superframe will be transmitted 64.25 ms later, assuming VDSL2 operation, there is sufficient time to transmit this instruction and allow the remote multicarrier apparatus to prepare the timestamp module 402 for timestamp generation. It is also possible to separate the timestamp generation between transmitter and receiver by more than one additional superframe. In such a case, the multicarrier apparatus 106 may correct the timestamp $T_1$ by a time offset that corresponds to the number of superframes that occur between the timestamp generation on transmit apparatus and remote apparatus ends.

In general, the master clock 214 and the ADSL/VDSL communication clock sources (not shown in FIG. 2 and FIG. 3) are not synchronized with each other. According to the ITU-T-G.992.3/5 and G.993.2 the ADSL/VDSL2, clocks may deviate from the nominal sample clock frequency by ±50 ppm (derived from subcarrier spacing). Exemplarily, with the maximum deviation of 50 ppm, a superframe duration changes by the following offset compared to its nominal duration:

17 ms superframe (ADSL): 850 ns 64.25 ms superframe (VDSL2): 3.21 µs

Accordingly, using the implementations described herein, nodes may regularly generate timestamps associated with subsequent contiguous groups of DMT symbols, e.g. subsequent superframes, in order to measure the duration of such contiguous groups of DMT symbols, e.g. subsequent superframes, and derive the actual duration of DMT symbols and superframes based on the master and slave clock timing. In case that the transmit and receive timestamps are not assigned to the predetermined time domain sample of the same predetermined DMT symbol but instead when the receiver is instructed to assign the receive timestamp to the predetermined time domain sample of a subsequent DMT symbol, e.g. N DMT symbols later) the corrected (actual) DMT symbol duration should be used to account for the time between the DMT symbols to which the timestamps are assigned. The actual duration of the N DMT symbols should be added to the transmit timestamp $T_1$ or $T_3$.

Exemplary Procedures

Exemplary procedures are described below. It should be understood that certain acts need not be performed in the order described, and may be modified, and/or may be omitted entirely, depending on the circumstances. The acts described may be implemented and executed by a computer, processor or other computer device, such as a multicarrier apparatus or device of the types describe herein, based on instructions stored on one or more computer-readable storage media associated with the wireless or wireline device and/or associated with other storage media not co-located with the device. The computer-readable storage media can be any available media that can be accessed by a computer device to implement the instructions stored thereon. As used herein, the term "instructions", "computer program" or "software" is meant to include any sequence or human or machine cognizable acts which perform a function. The exemplary procedures and acts may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like. Furthermore, the disclosed exemplary procedures and associated acts may be hardware and firmware as well, or alternatively as some combination thereof.

Figure 6:
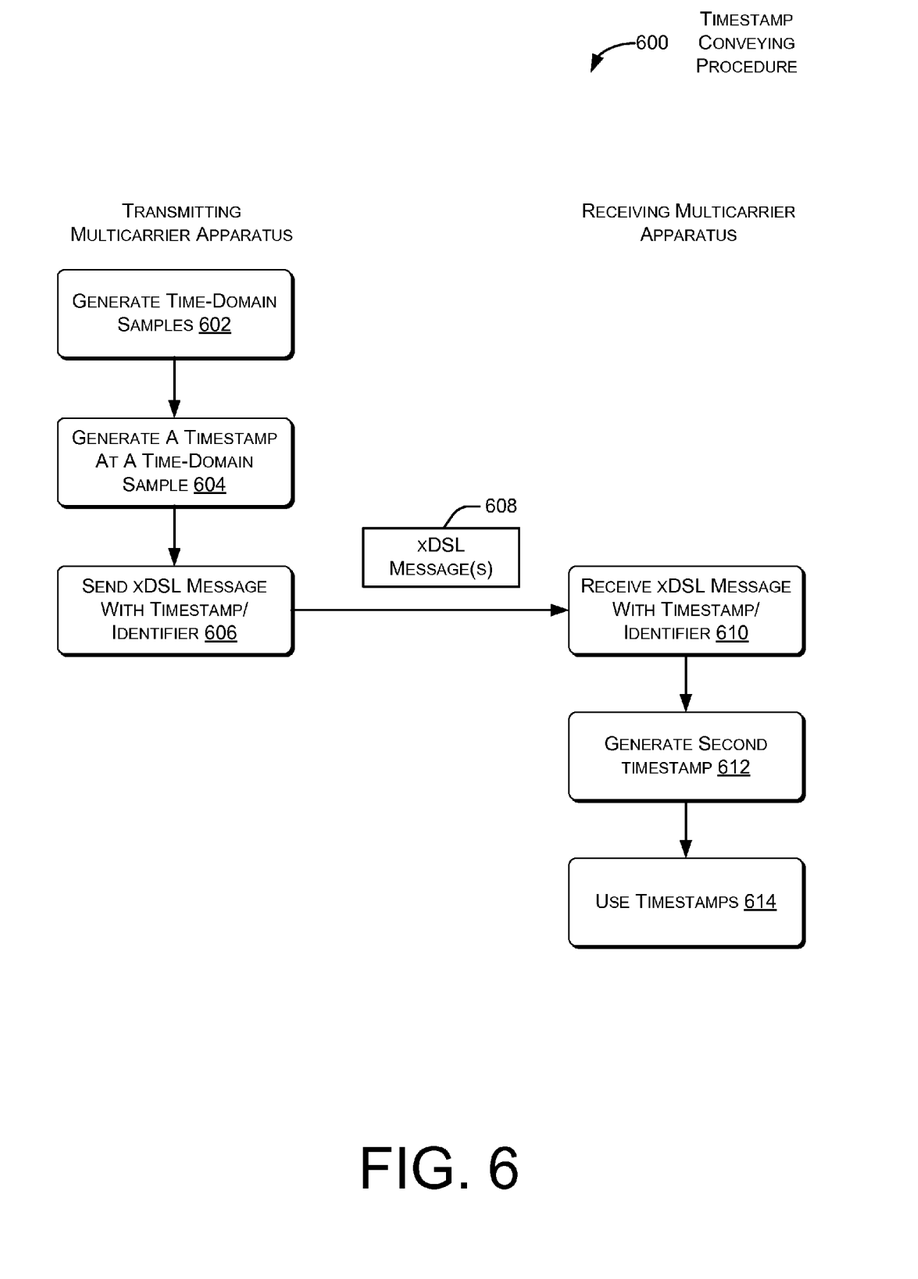
FIG. 6 is a flow diagram of a procedure useable to enable a multicarrier apparatus/node to convey a timestamp (e.g., clock related information) to another multicarrier apparatus.

FIG. 6 is a flow diagram of a procedure 600 useable to enable a multicarrier apparatus/node to convey a timestamp ($T_1$) (e.g., clock related information) to another multicarrier apparatus. At Act 602, a transmitting multicarrier apparatus generates a plurality of time-domain samples. At Act 604, a timestamp ($T_1$) is generated at substantially the same moment a predetermined time-domain sample of a DMT symbol is transmitted to a receiving node. In one implementation, the timestamp ($T_1$) is generated to coincide with the first time-domain sample of a DMT symbol. The timestamp ($T_1$) may be generated for every DMT symbol that is transmitted, every N DMT symbols, once per superframe, once per N superframes, or the like.

At Act 606, the transmitting apparatus sends the timestamp ($T_1$) and an identifier, which indicates at which time-domain sample the timestamp ($T_1$) was generated, in an xDSL message 608 to the another multicarrier apparatus. In one implementation, the transmitting apparatus sends the identifier before or after sending the timestamp ($T_1$).

At Act 610, a receiving multicarrier apparatus receives the xDSL message 608 that includes at least the identifier and may include the timestamp ($T_1$). At Act 612, the receiving multicarrier apparatus generates a timestamp ($T_2$) at the time-domain sample indicated by the identifier received in the message 608. At Act 614, the receiving multicarrier apparatus may use the timestamps $T_1$ and $T_2$ to reconstruct or synchronize its clock to a master or network clock in order to send and receive signals or applications that are synchronous to the master clock, such as voice over DSL or the like.

In an extension of the forgoing procedure, the receiving multicarrier apparatus and transmitting multicarrier apparatus may switch rolls and exchange timestamps $T_3$ and $T_4$ in the same or similar manner described.

While the exemplary implementations illustrated herein may show the various components of the arrangement collocated, it is to be appreciated that the various components of the arrangement may be located at distant portions of a distributed network, such as a communications network and/or the Internet, or within a dedicated secure, unsecured and/or encrypted arrangement. Thus, it should be appreciated that the components of the arrangements may be combined into one or more apparatuses, such as a modem, or collocated on a particular node of a distributed network, such as a telecommunications network. Moreover, it should be understood that the components of the described arrangements may be arranged at any location within a distributed network without affecting the operation of the arrangements. For example, the various components can be located in a Central Office modem (CO, ATU-C, VTU-O), a Customer Premises modem (CPE, ATU-R, VTU-R), an xDSL management device, or some combination thereof. Similarly, one or more functional portions of the arrangement may be distributed between a modem and an associated computing device.

The above-described arrangements, apparatuses and methods may be implemented in a software module, a software and/or hardware testing module, a telecommunications test device, a DSL modem, an ADSL modem, an xDSL modem, a VDSL modem, a linecard, a G.hn transceiver, a MOCA transceiver, a Homeplug transceiver, a powerline modem, a wired or wireless modem, test equipment, a multicarrier transceiver, a wired and/or wireless wide/local area network system, a satellite communication system, network-based communication systems, such as an IP, Ethernet or ATM system, a modem equipped with diagnostic capabilities, or the like, or on a separate programmed general purpose computer having a communications device or in conjunction with any of the following communications protocols: CDSL, ADSL2, ADSL2+, VDSL1, VDSL2, HDSL, DSL Lite, IDSL, RADSL, SDSL, UDSL, MOCA, G.hn, Homeplug or the like.

Additionally, the arrangements, procedures and protocols of the described implementations may be implemented on a special purpose computer, a programmed microprocessor or microcontroller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, any comparable device, or the like. In general, any apparatus capable of implementing a state machine that is in turn capable of implementing the methodology described and illustrated herein may be used to implement the various communication methods, protocols and techniques according to the implementations.

Furthermore, the disclosed procedures may be readily implemented in software using object or object-oriented software development environments that provide portable source code that can be used on a variety of computer or workstation platforms. Alternatively, the disclosed arrangements may be implemented partially or fully in hardware using standard logic circuits or VLSI design. The communication arrangements, procedures and protocols described and illustrated herein may be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed procedures may be readily implemented in software that can be stored on a computer-readable storage medium, executed on programmed general-purpose computer with the cooperation of a controller and memory, a special purpose computer, a microprocessor, or the like. In these instances, the arrangements and procedures of the described implementations may be implemented as program embedded on personal computer such as an applet, JAVA® or CGI script, as a resource residing on a server or computer workstation, as a routine embedded in a dedicated communication arrangement or arrangement component, or the like. The arrangements may also be implemented by physically incorporating the arrangements and/or procedures into a software and/or hardware system, such as the hardware and software systems of a test/modeling device.

The implementations herein are described in terms of exemplary embodiments. However, it should be appreciated that individual aspects of the implementations may be separately claimed and one or more of the features of the various embodiments may be combined.

For the purposes of this disclosure and the claims that follow, the terms "coupled" and "connected" have been used to describe how various elements interface. Such described interfacing of various elements may be either direct or indirect. Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims. The specific features and acts described in this disclosure and variations of these specific features and acts may be implemented separately or may be combined.

The invention claimed is:

1. A method, comprising:
   receiving, at a multicarrier apparatus, a first timestamp linked to a time-domain sample of a Discrete Multi-Tone (DMT) symbol, the first timestamp linked to the time-domain sample of the DMT symbol corresponding to a time at which the time-domain sample was ready for transmission over a communication medium; and
   generating, at the multicarrier apparatus, a second timestamp upon receiving the DMT symbol having the first timestamp linked to the time-domain sample.

2. The method according to claim 1, further comprising receiving a message that identifies the time-domain sample that is linked to the first timestamp.

3. The method according to claim 1, further comprising generating a third timestamp linked to another time-domain sample of a DMT symbol and transmitting another message that identifies the another time-domain sample of the DMT symbol that is linked to the third timestamp.

4. The method according to claim 3, further comprising receiving a fourth timestamp; and calculating clock synchronization information using the first, second, third and fourth timestamps.

5. The method according to claim 4, further comprising determining DMT symbol correction information based on at least one or more of the first, second, third and fourth timestamps.

6. The method according to claim 3, wherein the act of generating the second timestamp generates the second timestamp upon receiving a predetermined time-domain sample of the DMT symbol or the subsequent DMT symbol.

7. The method according to claim 6, wherein the predetermined time-domain sample of the subsequent DMT symbol is an initial time-domain sample of the DMT symbol or the subsequent DMT symbol.

8. A multicarrier apparatus, comprising:
   a controller; and
   a storage coupled to the controller and including executable instructions that enable the multicarrier apparatus to:
   receive a first timestamp, at the multicarrier apparatus, linked to a time-domain sample of a Discrete Multi-Tone (DMT) symbol, the first timestamp linked to the time-domain sample of the DMT symbol corresponding to a time at which the time-domain sample was ready for transmission over a communication medium, and
   generate, at the multicarrier apparatus, a second timestamp upon receiving the DMT symbol having the first timestamp linked to the time-domain sample.

9. The multicarrier apparatus according to claim 8, wherein the instructions further enable to the multicarrier apparatus receive a message that identifies the time-domain sample that is linked to the first timestamp.

10. The multicarrier apparatus according to claim 9, wherein the instructions enable the multicarrier apparatus to generate the second timestamp upon receiving a predetermined time-domain sample of the DMT symbol or the subsequent DMT symbol.

11. The multicarrier apparatus according to claim 10, wherein the predetermined time-domain sample of the DMT symbol or the subsequent DMT symbol is an initial time-domain sample of the DMT symbol or the subsequent DMT symbol.

12. The method according to claim 1, wherein the first timestamp linked to the time-domain sample of the Discrete Multi-Tone (DMT) symbol was generated at a rising or falling edge of a predetermined sampling rate clock signal.

13. The apparatus according to claim 8, wherein the first timestamp linked to the time-domain sample of the Discrete Multi-Tone (DMT) symbol was generated at a rising or falling edge of a predetermined sampling rate clock signal.

* * * * *